(12) United States Patent
Yarmarkovich

(10) Patent No.: US 12,611,287 B2
(45) Date of Patent: Apr. 28, 2026

(54) TECHNIQUES FOR DETERMINING PATIENT TEETH POSITIONS FOR ORTHODONTICS

(71) Applicant: LightForce Orthodontics, Inc.,
Burlington, MA (US)

(72) Inventor: Alexander Yarmarkovich, Swampscott, MA (US)

(73) Assignee: LightForce Orthodontics, Inc.,
Wilmington, MA (US)

( * ) Notice: Subject to any disclaimer, the term of this patent is extended or adjusted under 35 U.S.C. 154(b) by 352 days.

(21) Appl. No.: 18/082,108

(22) Filed: Dec. 15, 2022

(65) Prior Publication Data

US 2024/0197441 A1 Jun. 20, 2024

(51) Int. Cl.
*A61C 7/00* (2006.01)
*A61C 13/34* (2006.01)
*G06T 19/20* (2011.01)

(52) U.S. Cl.
CPC .............. *A61C 7/002* (2013.01); *A61C 13/34* (2013.01); *G06T 19/20* (2013.01); *A61C 2007/004* (2013.01); *G06T 2219/2004* (2013.01)

(58) Field of Classification Search
CPC ............. G06T 19/20; G06T 2219/2004; A61C 2007/004
See application file for complete search history.

(56) References Cited

U.S. PATENT DOCUMENTS 9,814,549 B2 11/2017 Lee et al.
10,614,174 B2 4/2020 Lee et al.
10,792,127 B2 10/2020 Kopelman et al.
10,993,782 B1 5/2021 Raslambekov
11,020,205 B2 6/2021 Li et al.
11,026,767 B1 6/2021 Raslambekov
11,191,620 B1 12/2021 Raslambekov
12,153,398 B2 * 11/2024 Shah ....................... G06T 19/20
2007/0072144 A1 * 3/2007 Imgrund .................. A61C 7/00
433/24
2009/0098502 A1 * 4/2009 Andreiko ............... A61C 7/002
433/24
2014/0229145 A1 8/2014 Van Lierde et al.

(Continued)

OTHER PUBLICATIONS

International Search Report and Written Opinion, mailed Apr. 15, 2024, for International Application No. PCT/US2023/083454.

(Continued)

*Primary Examiner* — Ryan M Gray

(74) *Attorney, Agent, or Firm* — Wolf, Greenfield & Sacks, P.C.

(57) ABSTRACT

Techniques are described for moving and aligning groups of teeth, including the teeth of an entire arch, for orthodontic treatment planning. One or more 3D models each representing one of a plurality of the patient's teeth may be analyzed to identify feature points that represent clinically relevant reference points on the tooth. An arch shape may be generated based on the feature points. One or more control points, which characterize the path of the arch shape, may then be generated (e.g., from the identified feature points). A user may provide input that modifies the positions of one or more of the control points to adjust the arrangement of teeth, thereby producing a new arch shape, and new positions of the teeth may be determined according to the new arch shape.

25 Claims, 11 Drawing Sheets

(56)      References Cited

U.S. PATENT DOCUMENTS

| | | | |
|---|---|---|---|
| 2014/0288894 A1 | 9/2014 | Chishti et al. | |
| 2017/0348071 A1* | 12/2017 | Jin | A61C 7/00 |
| 2018/0360567 A1 | 12/2018 | Xue et al. | |
| 2020/0306011 A1 | 10/2020 | Chekhonin et al. | |
| 2021/0378793 A1 | 12/2021 | Akopov et al. | |
| 2022/0110723 A1* | 4/2022 | Raby | A61C 7/002 |
| 2022/0222910 A1* | 7/2022 | Salah | G06V 10/44 |
| 2022/0338966 A1* | 10/2022 | Lancelle | G06F 30/10 |
| 2023/0149127 A1 | 5/2023 | Nikolskiy et al. | |
| 2023/0397972 A1* | 12/2023 | Kim | A61C 9/0053 |
| 2024/0065808 A1 | 2/2024 | Derakhshan et al. | |
| 2024/0193770 A1 | 6/2024 | Lee et al. | |
| 2024/0382288 A1* | 11/2024 | Jaisson | G16H 20/40 |
| 2025/0302588 A1 | 10/2025 | Yarmarkovich et al. | |

OTHER PUBLICATIONS

International Preliminary Report on Patentability, mailed Jun. 26, 2025, for International Application No. PCT/US2023/083454.
International Search Report and Written Opinion, mailed Jul. 22, 2025, for International Application No. PCT/US2025/022149.
Pighin et al., Synthesizing Realistic Facial Expressions from Photographs. In: Proceedings of the 25th Annual Conference on Computer Graphics and Interactive Techniques (SIGGRAPH). Association for Computing Machinery. 1998:75-84.

\* cited by examiner

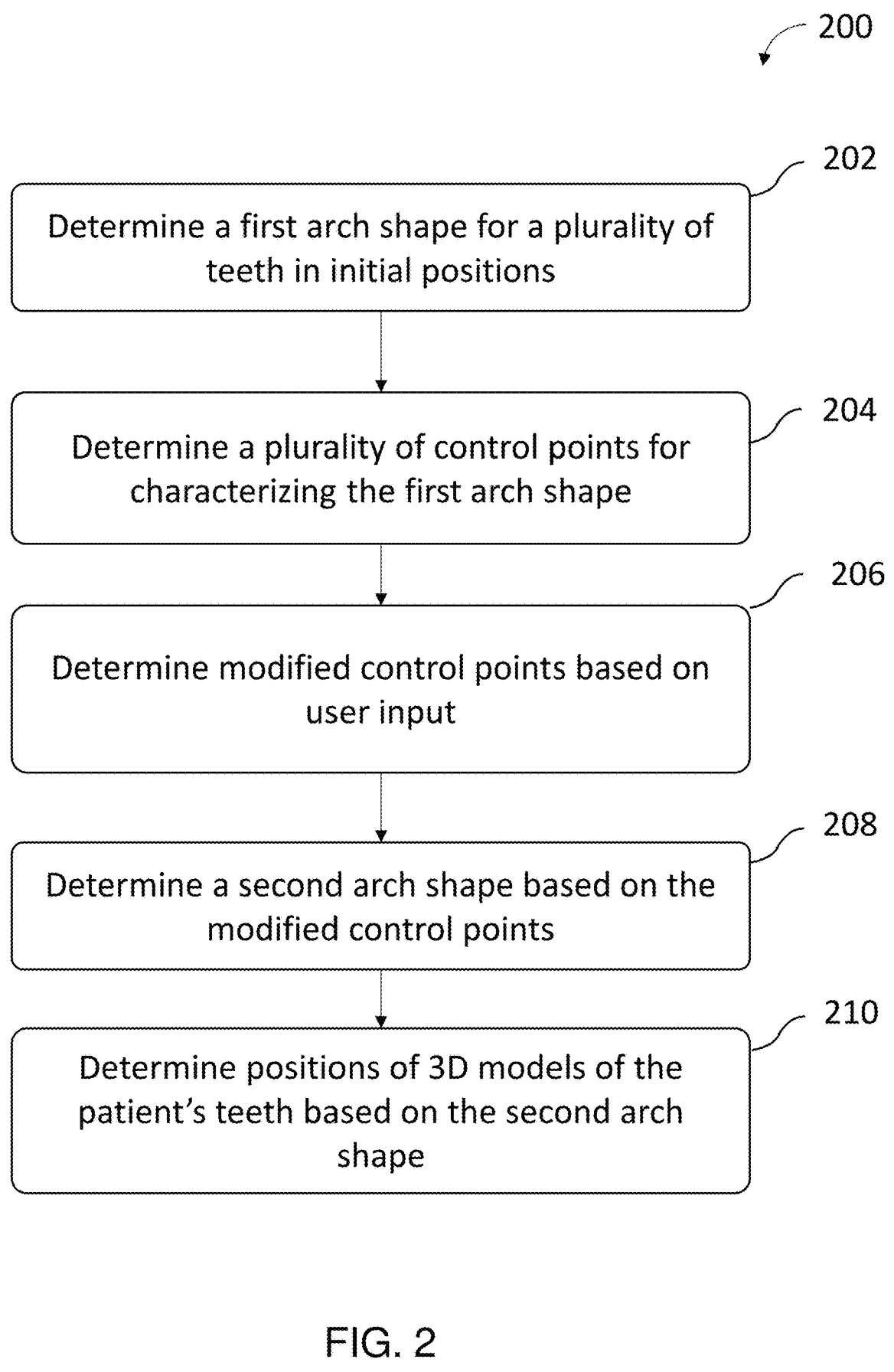

200

202

Determine a first arch shape for a plurality of teeth in initial positions

204

Determine a plurality of control points for characterizing the first arch shape

206

Determine modified control points based on user input

208

Determine a second arch shape based on the modified control points

210

Determine positions of 3D models of the patient's teeth based on the second arch shape

FIG. 2

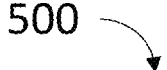
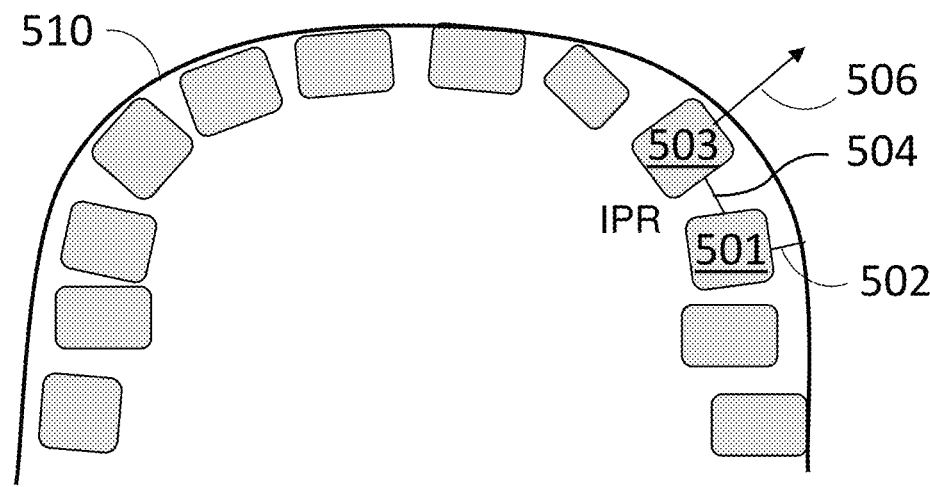
FIG. 5A

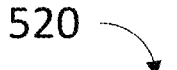
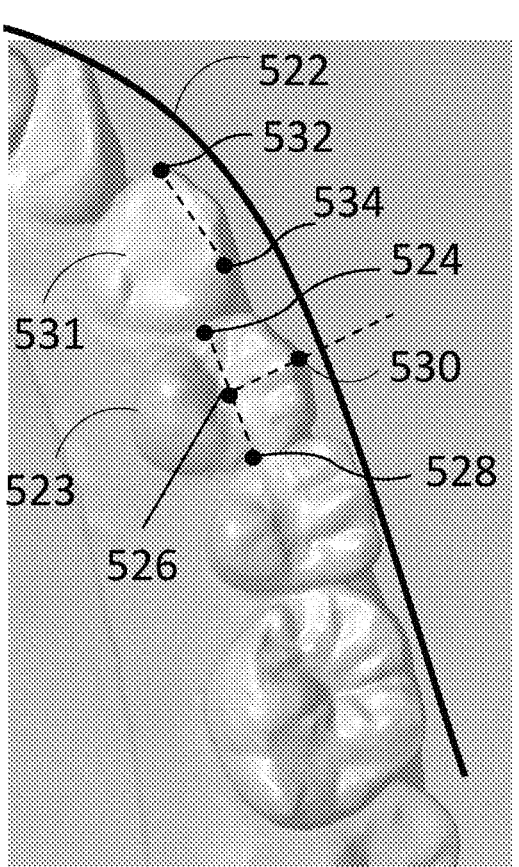
FIG. 5B

TECHNIQUES FOR DETERMINING PATIENT TEETH POSITIONS FOR ORTHODONTICS

FIELD

The present application relates generally to techniques for determining the positions of a patient's teeth for planning an orthodontic procedure.

BACKGROUND

A misalignment of teeth, otherwise known as malocclusion, can present medical challenges, including gum disease, tooth decay or loss, and long-term effects on the jaw. Malocclusions can also be aesthetically unpleasant and therefore undesirable for a patient. In some instances, a more aesthetic smile can enhance a patient's self-esteem and quality of life.

Edward Angle, who first classified various malocclusions, noted teeth should all fit on a line of occlusion, a smooth curve through the central fossae and cingulum of the upper canines, and through the buccal cusp and incisal edges of the mandible. Any deviations from this line of occlusion can result in malocclusions. The field of orthodontics involves the study and management of malocclusions, as well as misaligned bite patterns (e.g., overbites) and jaw arrangements.

Conventionally, orthodontic procedures involve orthodontic appliances such as braces, which apply static mechanical forces on the teeth to induce bone remodeling and facilitate alignment. Braces can include brackets adhered to the face of each tooth, connected to one another with archwires formed of resilient materials (e.g., nickeltitanium alloys). The archwires are adjusted throughout the orthodontic procedure to exert variable forces on the teeth and induce movement. The combination of the biomechanics of the mouth, as well as the orthodontic appliance can improve a patient's smile according to a treating clinician's orthodontic treatment plan.

SUMMARY

According to some aspects, a computer-implemented method is provided for determining target positions of a patient's teeth for an orthodontic procedure, the method comprising using at least on processor determining a first arch shape for initial positions of the plurality of teeth based on a plurality of feature points that each that each identifies a location with respect to one of the plurality of teeth, determining a plurality of control points for characterizing the first arch shape, receiving user input indicative of a change in position of one or more of the plurality of control points, thereby defining a modified plurality of control points, determining a second arch shape based on the modified plurality of control points, and determining positions of a plurality of 3D models of the patient's teeth based on the second arch shape.

According to some aspects, at least one computer readable medium is provided comprising instructions that, when executed by at least one processor, perform a method for determining target positions of a patient's teeth for an orthodontic procedure, the method comprising determining a first arch shape for initial positions of the plurality of teeth based on a plurality of feature points that each identifies a location with respect to one of the plurality of teeth, determining a plurality of control points for characterizing the first arch shape, receiving user input indicative of a change in position of one or more of the plurality of control points, thereby defining a modified plurality of control points, determining a second arch shape based on the modified plurality of control points, and determining positions of a plurality of 3D models of the patient's teeth based on the second arch shape.

According to some aspects, a system is provided comprising at least one processor, and at least one computer readable medium comprising instructions that, when executed by the at least one processor, perform a method for determining positions of a plurality of feature points of a patient's tooth based on a statistical tooth model, the method comprising determining a first arch shape for initial positions of the plurality of teeth based on a plurality of feature points that each identifies a location with respect to one of the plurality of teeth, determining a plurality of control points for characterizing the first arch shape, receiving user input indicative of a change in position of one or more of the plurality of control points, thereby defining a modified plurality of control points, determining a second arch shape based on the modified plurality of control points, and determining positions of a plurality of 3D models of the patient's teeth based on the second arch shape.

The foregoing apparatus and method embodiments may be implemented in any suitable combination of aspects, features, and acts described above or in further detail below. These and other aspects, embodiments, and features of the present teachings can be more fully understood from the following description in conjunction with the accompanying drawings.

BRIEF DESCRIPTION OF FIGURES

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 2 is a flowchart of a method of determining target positions of a patient's teeth for an orthodontic procedure, in accordance with some embodiments;

FIG. 5A shows an illustrative diagram of act 210, in accordance with some embodiments;

FIG. 5B shows illustrative feature points which may be used to orient a 3D tooth model to the second arch shape, in accordance with some embodiments;

DETAILED DESCRIPTION

Figure 1A:
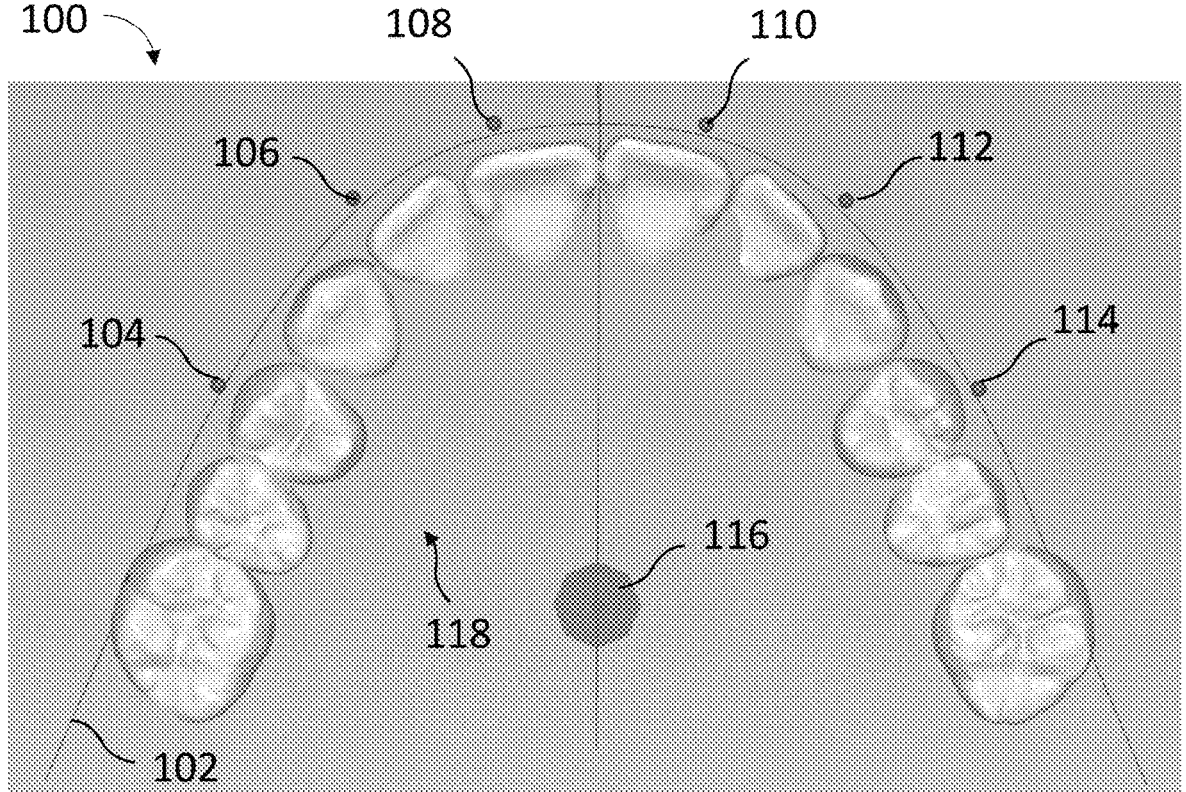
FIG. 1A shows a configuration of the patient's teeth in connection with an orthodontic treatment plan, in accordance with some embodiments.

Orthodontic procedures use tools such as brackets and archwires to apply forces to teeth to cause their movement towards desired treatment positions. During a procedure, brackets may be attached directly to a patient's teeth and an archwire attached to the brackets. In some cases, the arch- wire may have a predefined shape that represents a desired final arrangement of the patient's teeth. When the archwire is attached to brackets on the patient's teeth in their initial configuration, it may be stretched or distorted from that predefined shape in order to connect to each of the brackets. Once distorted, elastic forces applied by the archwire pull the wire towards its predefined shape thereby applying forces to the brackets and teeth, and gradually bring the teeth into the desired arrangement.

To determine the specifics of an orthodontic treatment plan, such as where to place brackets and the archwires, a medical professional may first arrange three-dimensional (3D) geometrical models of a patient's teeth into a desired configuration representing a goal of the treatment. This configuration may imply a particular position and shape for the archwire. The medical professional may then determine suitable bracket and archwire placement that will adjust the patient's teeth into the desired final configuration through the above-described process of applying forces to the brack- ets and teeth via the archwire.

Various types of pretreatment planning software tools allow medical professionals to model teeth in connection with configuring an orthodontic treatment plan. Some pre- treatment planning software may use an analytical model that generally describes tooth positions, using the same set of 3D teeth models for each patient. However, since these models don't describe tooth shapes and/or locations that are unique to a given patient, they may be of limited use in planning treatment. For instance, given the complex and unique shapes of teeth and the precision with which orth- odontic treatments must address the relative positions between teeth to produce effective treatment, analytical models may lack a sufficient level of detail for determining effective orthodontic treatment plans.

Other types of pretreatment planning software may con- struct 3D models of the teeth based on images or scans of patient's teeth to capture a desired level of detail. However, using 3D models with detail sufficient for clinical determi- nations requires a medical professional to move around each of these teeth to produce a suitable final arrangement of teeth, prior to producing a desired bracket and archwire configuration. Due in part to the customized nature of these models, this process can be very time consuming and requires a high level of expertise.

The inventors have recognized and appreciated tech- niques for easily moving and aligning groups of teeth, including the teeth of an entire arch, in which the teeth are represented by 3D models specific to a patient's teeth. One or more 3D models each representing one of a plurality of the patient's teeth (e.g., the teeth of one arch) may be analyzed to identify feature points that represent clinically relevant reference points on the tooth. An arch shape may be generated based on the feature points. One or more control points that characterize the path of the arch shape may then be generated (e.g., from the arch shape and/or from the identified feature points). A user may provide input that modifies the positions of one or more of the control points to adjust the arrangement of teeth, thereby producing a new arch shape, and new positions of the teeth may be deter- mined according to the new arch shape. As a result, teeth in a given arch may be arranged by a user into a target arch shape more efficiently, while still representing the custom- ized location and including the size/shape of each tooth for the patient.

According to some embodiments, an arch shape may be generated based on one or more positions, distances between and/or relative orientations of one or more teeth, or any part or parts thereof. For instance, an arch shape may be gener- ated based on one or more feature points that each represent a clinically relevant reference point on one of the teeth. For instance, an arch shape may be generated based on one or more feature points on the first molars, the canines, and/or the central incisors. In some embodiments, an arch shape may be determined as a curve that passes through, or is otherwise defined by, particular feature points on particular teeth. In some embodiments, one or more arch points may be determined based on one or more feature points (e.g., by applying an offset, such as a facial offset, to one or more feature points) and the arch shape determined as a curve that passes through, or is otherwise defined by, the arch points. In some embodiments, an arch shape is calculated as a non-uniform rational basis spline (NURBS) curve that passes through, or is otherwise defined by, a plurality of feature points or a plurality of arch points.

According to some embodiments, control points for an arch shape may be generated based on the positions of one or more feature points. The control points may be selected as those feature points, or may otherwise be based on those feature points. For example, control points may be selected as facial axis (FA) points on the two canines, or an offset from these points. In some embodiments, control points for an arch shape may be selected as, or may be otherwise based on, one or more arch points that were determined based on one or more feature points and that define the arch shape. Modification of one or more of the control points may cause generation of a modified arch shape (e.g., automatically as a result of the modification of the control point(s) or as a result of user input). As a result, a user may modify the arch shape by modifying the position of one or more control points.

A NURBS curve, or other suitable curve selected for the arch shape, may provide for efficient user adjustments to the shape and for efficient computation of the arch shape. According to some embodiments, user adjustments to the arch shape may include user input on a graphical user interface (GUI) to adjust the positions of one or more control points. The user may select and drag control points on the GUI to change their displayed position on the GUI which may then be used as an input to calculate a new curve for the arch shape.

According to some embodiments, feature points may be determined based on 3D models of the patient's teeth. For instance, a medical professional may manually indicate the location of such feature points, and/or a suitable statistical model of teeth may be applied to the 3D models of the teeth. A statistically generated tooth model may provide for effi- cient determination of the feature points, whether by deter- mining the feature points without requiring manual input, or by providing an initial estimate of the feature point positions that can be verified and/or modified manually by a user. In some embodiments, suitable feature points from which control points may be determined may include the centroid points (corresponding to the midpoint of the teeth along the root axis), facial axis (FA) points (corresponding to the midpoint of the clinical crown along a tooth's facial axis), cusp points (corresponding to elevated protruding portions of the tooth on the biting surface), and pit/groove points (corresponding to depressed portions of the tooth on the biting surface).

According to some embodiments, positions and/or orientations of one or more teeth may be determined based on a defined arch shape. As described above, a user may define a desired arch shape by adjusting the positions of one or more control points. Subsequently, positions and/or orientations of the teeth may be calculated according to the defined arch shape. In some embodiments, positions and/or orientations of one or more teeth may be determined based on a relative position of feature points of the one or more teeth with respect to the arch shape. The feature points describe specific anatomical features of the teeth and by extension describe the orientation of the tooth with which they are associated. Therefore, by comparing the orientation of the feature points with the arch shape, transformations can be determined for the alignment of the teeth to the arch. For example, an alignment line which passes through the centroid and FA points may be used to align the tooth to the arch by determining a transformation for the tooth that would position the alignment line substantially perpendicular to the arch.

To illustrate the above-described process in which a medical professional produces a desired arch shape for a patient's teeth, FIG. 1A shows a configuration 100 of the patient's teeth in connection with an orthodontic treatment plan. The configuration 100 includes an illustrative arch shape 102 with control points 104, 106, 108, 110, 112, 114, and 116 that allow a user to adjust positions and/or orientations of the teeth. A desired configuration may be generated using 3D models (also referred to herein as "models") of the patient's teeth 118 which may, for instance, be obtained from scan data produced by scanning the patient's teeth. As will be described in further detail below, the position and/or orientation of each tooth model may be determined based at least in part on the arch shape. To adjust the positions of the teeth, a user may provide input to a computing system presenting the user interface shown in FIG. 1 that causes a change in the position of any one or more of the control points 104, 106, 108, 110, 112, 114, and 116, thereby changing the shape of the arch shape. In response to the change in position of the control point(s), the computing system may determine new positions and/or orientations of one or more of the tooth models. Control point 116 may be used to move the whole set of control points for the upper jaw, in accordance with some embodiments. For example, motion of control point 116 may produce the same motion in each of control points 104, 106, 108, 110, 112, and 114, so that control point 116 allows for movement of all the control points as a group.

As described above, the arch shape 102 may correspond to the shape of the archwire to be used in combination with brackets for use in an orthodontic treatment plan, according to some embodiments. The positioning of a tooth, based on the arch shape, may take into account the profile of the brackets in determining the positioning of the tooth such that an archwire which follows the shape of the arch 102 will pass through each of the brackets involved in the orthodontic procedure. For example, a computing system may determine positions and/or orientations of one or more teeth by arranging the teeth with an offset distance from the arch shape, where the offset is selected based on the bracket profile.

In some embodiments, the models of the patient's teeth 118 may be generated based on a scan of the patient's teeth.

In some embodiments, the models may be generated based on images taken of the patient's teeth. For example, the 3D model teeth 118 may be generated from a plurality of images captured of a patient's upper teeth. Similarly, a corresponding process may be used to generate models of the patient's teeth in a lower jaw.

A "3D model" (or simply "model") as referred to herein may include any data describing a three-dimensional structure or structures, irrespective of file format or number of data files. Moreover, a model may be represented in numerous ways, and are not limited to polygonal models, but may include any way of representing a three-dimensional structure, including point clouds, shell models, volumetric or displacement models, etc.

Figure 1B:
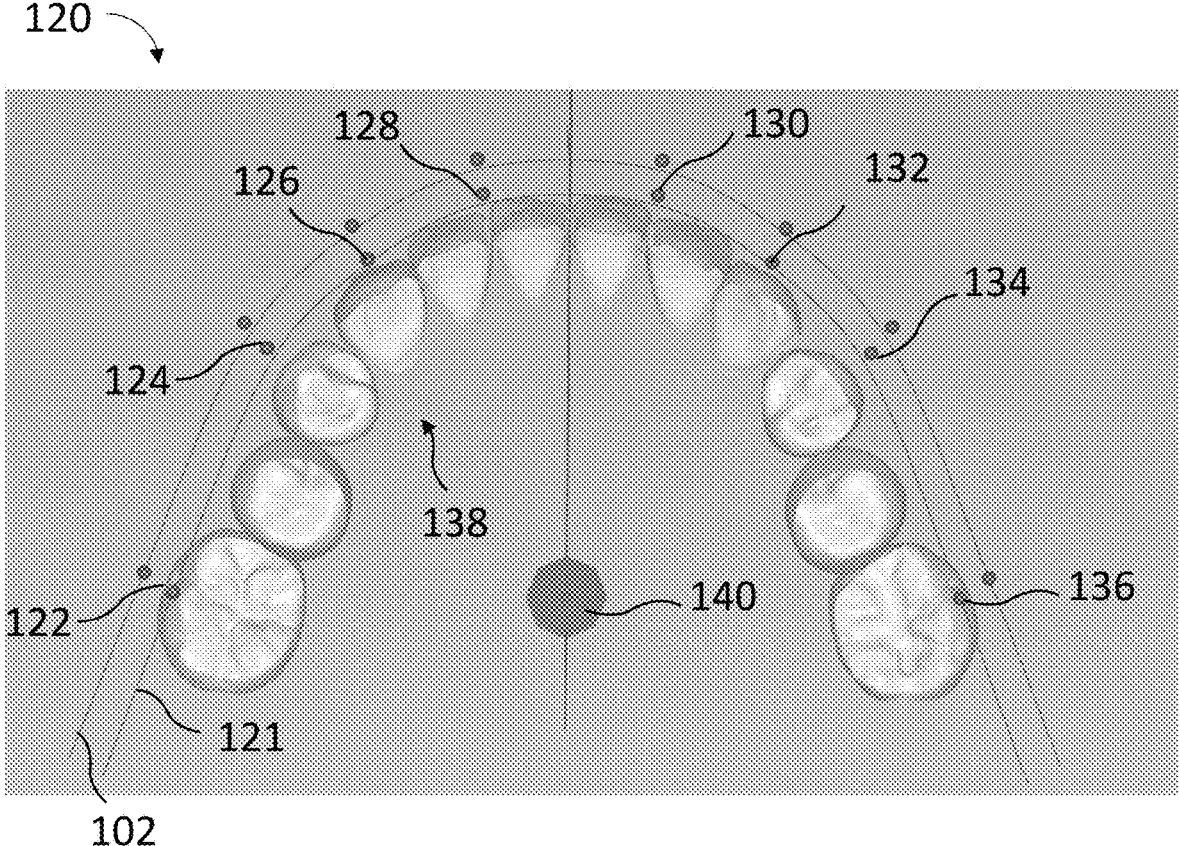
FIG. 1B shows an arch shape with control points for a patient's lower jaw, in accordance with some embodiments.

FIG. 1B shows an arch shape with control points for a patient's lower jaw, according to some embodiments. As with the desired tooth configuration for the upper jaw, described above, FIG. 1B shows a configuration of the patient's teeth in connection with an orthodontic treatment plan. The configuration 120 includes an illustrative arch shape 121 with control points 122, 124, 126, 128, 130, 132, 134, and 136 that allow a user to adjust positions and/or orientations of the teeth. Control points and an arch shape for the upper jaw are also visible in FIG. 1B, although are not labeled except for arch shape 102. As with control point 116, motion of control point 140 may produce the same motion in each of control points 122, 124, 126, 128, 130, 132, 134, and 136, so that control point 140 allows for movement of all the control points as a group.

As shown in FIG. 1B, an arch shape for the upper jaw 102 may be displayed alongside arch shape 121 and 3D tooth models 138 such that the lower jaw arch shape 121 may be coordinated with the upper jaw arch shape 102 by moving one to be aligned with the other. For example, the lower jaw arch shape 121 may be moved such that it is parallel to upper jaw arch shape 102.

When aligning the upper and lower jaw arch shapes, arch shapes 102 and 121 may be aligned to produce a given overjet offset (e.g., overbite) between the 3D tooth models in the upper jaw and the 3D tooth models in the lower jaw. Additionally, when aligning the two arch shapes, the midline (the line between the two front teeth) for each may also be aligned so as to be substantially parallel. Although illustrated with the 3D tooth models for the lower jaw, the alignment process could be performed using the 3D tooth models for the upper jaw displayed with both arch shapes, as aspects of the technology described herein are not limited in this respect.

FIG. 2 is a flowchart of a method of determining target positions of a patient's teeth for an orthodontic procedure, according to some embodiments. Method 200 may be performed by a suitable computing system, examples of which are described below, which may for instance implement an orthodontic treatment planning application. Prior to the start of method 200, models of one or more teeth of a patient may be manually and/or automatically produced based on images and/or scans of the patient's teeth. The models of the teeth may then be received or otherwise obtained by the system performing method 200. Method 200 may be initiated in response to user input provided to the computing system, such as the user interacting with a suitable control in a graphical user interface (e.g., by clicking on a "generate arch" button).

In act 202, the system performing method 200 determines a first arch shape. As described above, the first arch shape may describe or otherwise relate to initial positions of a plurality of the patient's teeth (e.g., the positions representing the present state of the patient's teeth prior to the planned orthodontic treatment). In act 202, the first arch shape may be determined based on a plurality of feature points of the teeth in their initial positions. Feature points may describe locations on, or otherwise relative to, a patient's tooth as described above, and may include medically relevant points on the surface of particular teeth. In some cases, a different set of feature points may be defined for different teeth, or different types of teeth. For example, feature points may describe specific locations that characterize the shape of a patient's tooth, such as central points, marginal points, premolar cusps, molar cusps, facial axis points, marginal points, pit/groove points and/or centroid points. A given tooth may have any number of feature points associated with it in the context of method 200, so that in some cases, one of the teeth may have one number of features associated with it, whereas another tooth may have a different number of (including zero) associated feature points.

According to some embodiments, the first arch shape generated in act 202 may be generated based on one or more feature points associated with the teeth and/or reference points for a patient's jaw. In some embodiments, the first arch shape is generated in act 202 by generating a curve that passes through, or is otherwise defined by, one or more feature points and/or passes through, or is otherwise defined by, one or more points determined from one or more feature points. These points which are determined based on feature points may be hereinafter referred to as "arch points." An arch point may be, for instance, generated by applying a distance offset to a feature point (e.g., a facial offset). In some embodiments, the first arch shape may be generated to be a curve that passes through, or is otherwise defined by, a plurality of arch points determined from one or more facial axis (FA) points and/or incisal points. The locations through which the first curve is generated may be associated with specific teeth, and not necessarily all of the teeth in one arch.

In some embodiments, the midline of the arch is generated by determining a plurality of mid-points between teeth on opposing sides of the patient's jaw. For example, a first mid-point may be determined as average position of the FA points for the two central teeth. A second mid-point may be generated as the average position of the FA points for the molar tooth closest to the back of the mouth for which a corresponding same molar is located on the other side of the jaw.

In some embodiments, the first arch shape may be generated to pass through, or generated as a curve defined by, particular feature points. For example, a first arch shape may be generated such that the curve passes through, or is defined by, the FA points and/or incisal points of the 1, 2, and 4 teeth (twelve teeth in total), numbered according to the Palmer notation. As another example, a first arch shape may be generated such that the curve passes through, or is defined by, the FA points and/or incisal points of the 1, 3, 4 and 6 teeth (sixteen teeth in total). In some cases, the first arch shape may also be generated in act 202, at least in part, based on the facial midline.

In some embodiments, the first arch shape may be generated as a NURBS curve that passes through: (1) the FA points for the last posterior teeth; (2) the FA points on the canine teeth; and (3) points determined by applying a horizontal offset, of half of the horizontal distance between the FA points of the central teeth and the lateral incisor teeth, to the FA points on the central teeth.

In some embodiments, the first arch shape may be determined based on the distances between one or more pairs of feature points of the patient's teeth. For instance, the first arch shape may be generated to pass through, or be defined by, a pair of arch points that are separated by the distance between a pair of feature points (or the distance between the pair of feature points plus a fixed offset). For example, a pair of arch points may be separated by the width across the midline between the facial axis points on the upper right 6 tooth and the upper left 6 tooth. As a result, the distances between feature points may parameterize the dimensions of the resulting curve, at least in part. In some embodiments, the first arch shape may be parameterized by one or more width parameters that describe the width of the arch at different positions across the arch, such as at different heights (where the height of the arch is measured from the arch vertex, which is oriented near the front of the mouth, towards the back of the mouth along the midline).

As further examples, a pair of arch points may be separated by the width across the midline between the facial axis points on the upper right 3 tooth and the upper left 3 tooth, and/or a pair of arch points may be separated by the width across the midline between the upper right 1 tooth and the upper left 1 tooth, respectively. The first arch shape may be generated to pass through, or be defined by, any number of such arch points.

In cases in which the distances between feature points parameterize the dimensions of the first arch shape, at least in part, the distances may in some embodiments account for the position of a bracket attached to the crown of the tooth. Accordingly, the size as well as attachment position for a particular bracket may be included in the distance determination, such that the determined distances may correspond to the actual dimensions of an arch wire that could be used in the orthodontic procedure.

In some cases, a patient may be missing at least one tooth, in which case determining the first arch shape may be based on one or more feature points of a different, substitute tooth. For instance, when a first arch shape is typically determined based on one or more feature points of a first tooth, and that first tooth is missing in a patient, the first arch shape may instead be determined based on the corresponding feature points of a different, second tooth as a substitute. Act 202 may therefore comprise determining that a tooth is missing for a patient, and basing the determination of the first arch shape on the feature points of a substitute tooth instead of the feature points of the typical tooth. For example, the first arch shape may be generally determined based on the facial axis points on the upper right 6 tooth and the upper left 6 tooth. When one of these teeth is determined to be missing, however, the first arch shape may instead be determined based on the facial axis point on the corresponding 5 tooth. Similarly, the 2 teeth may act as substitutes when one of the 3s is missing, and/or the 4 teeth may act as substitutes when one of the 3s is missing.

According to some embodiments, the first arch shape may be determined based on a predefined offset distance, also referred to herein as an "in/out distance." The first arch shape may be generated so that it is arranged the offset distance away from the teeth (e.g., from a feature point on the teeth). For example, an in/out distance may specify a desired offset distance between a feature point for the 3D tooth and the first arch shape, with the offset extending towards or away from the midline of the curve. In some embodiments, the positions of a plurality of arch points may be determined by applying the in/out distance offset to a plurality of feature points. The first arch shape may then be generated to pass through, or otherwise be defined by, these generated arch points. In some embodiments, the in/out distances for one or more teeth may be specified by a user.

In some embodiments, in/out distances may be determined for with specific teeth (or teeth types) based on the size of a bracket that would be associated with the respective tooth and a distance that the bracket would need to sit on the tooth while accommodating the arch wire. For example, the in/out distance for a given tooth may be automatically determined based on data describing a bracket to be affixed to that tooth (e.g., the in/out distance may be set to be the distance from the bracket-tooth surface to the expected archwire location on the bracket).

According to some embodiments, the first arch shape may have a height determined based on one or more distances measured along an axis oriented substantially parallel to the midline. For example, a height of the first arch shape may be determined to be a distance between facial axis points on the 1s and the 3s measured along the axis oriented substantially parallel to the midline. In cases in which the width of the first arch shape is parameterized by one or more width parameters across the teeth, with this approach the height of the first arch shape between the 1s and 3s may be selected to be a distance between first width and second width parameters along the midline. Similarly, a height of the first arch shape may be determined to be a distance between facial axis points on the 3s and the 6s, and the height of the first arch shape between the 3s and 6s may be selected to be a distance between second and third width parameters along the midline.

According to some embodiments, generating the first arch shape may comprise generating a curve that passes through, or is otherwise defined by, the identified points (whether feature points, arch points or combinations thereof). Suitable curves may include a spline, such as a cubic spline, a basis spline (B-spline), a non-uniform rational basis spline (NURBS). In each of the approaches described above, the first arch shape may either pass through each of the identified points, or may follow, without necessarily passing through, the points. The latter is generally referred to above as a curve or first arch shape being 'defined' by the identified points. In some embodiments, the first arch shape may be a NURBS curve defined by identified points having respective positions and weights.

In some embodiments, the NURBS curve may be a $2^{nd}$ order NURBS curve. In some embodiments, NURBS curves of different orders may be used. For example, a $1^{st}$ order, $3^{rd}$ order, or higher than $3^{rd}$ order NURBS curve may be used, as aspects of the technology described herein are not limited in this respect. In some embodiments, the NURBS curve may use uniform knots. In some embodiments, the NURBS curve may use non-uniform knots.

In act 204 the system performing method 200 determines a plurality of control points for characterizing the first arch shape. As described above, the control points may be points with positions that can be modified by user input to adjust the path of the arch shape. Having generated the first arch shape in act 202, method 200 then includes determining control points that allow user modification of the generated first arch shape, in act 204.

In some embodiments, after the first arch shape has been generated to pass through, or be otherwise defined by, a plurality of locations, a control point may be determined at one or more (including at all of) the locations based on which the first arch shape was generated. According to some embodiments, the control points determined in act 204 may be generated at the positions of feature points of one or more teeth, and/or at the positions of one or more arch points determined from feature points of one or more teeth. For example, the control points may be generated at the positions of the FA points for at least a subset of teeth in the patient's jaw.

According to some embodiments, the control points determined in act 204 may comprise one or more curve control points (e.g., spline control points) generated for the first arch shape. For instance, at least some of the control points may be generated once the first arch shape has been generated and may be independent of any feature points or arch points used to generate the first arch shape. Control points that are generated at the positions of feature points of one or more teeth, and/or at the positions of one or more arch points determined from feature points of one or more teeth, may be generated in addition to the control points that are independent of any feature points or arch points used to generate the first arch shape.

In some embodiments, control points may be generated at one or more locations that define the first arch shape, which may include one or more feature points and/or arch points, as described above. For instance, where the first arch shape is a spline defined by one or more points, which include feature points and/or arch points, control points may be generated at the positions of at least some of the one or more points. As a result, modification of the position of the control points by a user may define a new spline curve.

As described above, in some cases the first arch shape may be generated based on determined distances between the plurality of feature points and/or arch points, and as such, control points may be generated at the locations which parametrize the first arch shape. For example, as shown in FIG. 1A, control points 104 and 114 are positioned according to the planned placement of tube brackets on facial axis points on the 4s; control points 106 and 112 are positioned according to the planned placement of brackets on the facial axis points on the 2s; and control points 108 and 110 are positioned according to the planned placement of central brackets on the facial axis points on the 1s.

Accordingly, in some embodiments a NURBS curve 102 may have initial parameters corresponding to the widths and distances determined from the feature points such that the curve passes through the control points. For example, curve 102 passes through control points 104, 106, 108, 110, 112, and 114—as shown in FIG. 1A. An additional control point, which the arch does not pass through, may be included for adjusting the center axis of the arch shape. For example, curve 102 does not pass-through control point 116, which is based on the center axis of the arch shape.

In act 206, the system performing method 200 modifies one or more of the control points determined in act 204 based on user input. Irrespective of which of the above-described techniques are used to generate the control points, the positions of the control points may, at least in part, define the arch shape. The positions of the control points may be adjusted in response to suitable user input, such that a change in the position of a control point will define new arch shape. For instance, where the arch shape is determined based on one or more feature points and/or arch points that are selected as control points, movement of any of these control points may define a new arch shape. The new arch shape can be generated automatically by the system in response to a change in one control point, or in response to user input requesting that a new arch shape is generated.

User input indicating a new position for one or more of the control points may be provided in any suitable way, including via a graphical user interface (GUI). In response to a user modifying the position of a control point, an updated position for the modified control point is determined. In some embodiments, the system performing method 200 may generate a GUI that displays control points, and a user may move a control point (e.g., by clicking and dragging the control point) from an initially displayed position to a desired position. In some embodiments, the movement of the control point by the user may be quantified as a translation to the original position to generate an updated control point position. In other embodiments, the movement of the control point may be treated as a new point which replaces the previous control point in the set of control points.

According to some embodiments, the motion of control points in response to user input in act 206 may be limited to movement in two dimensions such as a direction corresponding to the width of the curve and a direction corresponding to the height of the curve within the occlusal plane. In other embodiments, the curve may be configured to move in three dimensions, including the directions corresponding to the width and height of the curve and further including an out-of-plane direction. Accordingly, a user can adjust the arch shape by adjusting the positions of the control points.

In some embodiments, the arch shape may be configured to be symmetric. Accordingly, when a control point on one side of the midline is moved in act 206, the system executing method 200 will automatically modify the corresponding point on the opposite side of the midline such that the symmetry of the arch shape is maintained across the midline. Alternatively, the arch shape may be configured to include asymmetric configurations. Accordingly, each control point may be separately controllable and may be adjusted without resulting in corresponding modifications to points on the opposite side of the midline. Asymmetric and symmetric embodiments are described in further detail below with reference to FIG. 3A-3C.

In act 208, the system performing method 200 determines a second arch shape based on the modified control points. According to some embodiments, the second arch shape may be determined in response to user input provided in act 206 and/or in response to determining the positions of the modified control points in act 206. The second arch shape may be determined in a manner that depends on how the control points define the arch shape.

As described above, in some embodiments the control points may be determined at one or more locations that define the first arch shape, such as one or more feature points and/or arch points. In such cases, a new location for one or more of these feature points and/or arch points may be determined as a modified location of one or more control points, as the second arch shape determined for the new locations of the feature points and/or arch points in the same manner as they were used to determine the first arch shape.

In some embodiments, act 208 may comprise generating a curve defined by the modified control points (e.g., a new spline, such as a cubic spline, a basis spline (B-spline), or a non-uniform rational basis spline (NURBS)). As such, in some cases the generation of the second arch shape in act 208 may be based entirely on the positions of the control points, and not on any feature points or other points used to determine the first arch shape.

In some embodiments, width parameters for a second arch shape may be determined based on horizontal changes to one or more of the control points. For example, a control point associated with the upper right 3 tooth may be moved to the right (further from the midline). In response to the movement of the control point associated with the upper right 3 tooth, a new width may be calculated from the midline to the position of the modified control point. An arch shape based on the modified control points is determined from the positions of each of the modified control points. Thus, as a result of the new width, the curve of the arch will be recalculated to accommodate the expanded width around the upper right 3 tooth. In some embodiments, the arch shape will be a curve which passes through each of the control points. In other embodiments, additional control points which may be used to adjust the parameters such as widths or heights of the curve but which the curve does not pass through may be included.

According to some embodiments, acts 206 and 208 may be repeated one or more times, with control points being modified and a new arch shape being determined as a result, until a desired arch shape has been defined by the user's input.

In act 210, the system performing method 200 determines positions of the models of the patient's teeth based on the second arch shape. According to some embodiments, each model of the patient's teeth may be placed relative to the second arch shape with a position and orientation determined based on the second arch shape. In some embodiments, each model of the patient's teeth may be placed and/or oriented relative to the second arch shape based on one or more aspects of the model, which may include one or more feature points of the model. For example, a tooth model may be positioned relative to the second arch shape so as to have a desired in/out distance relative to the second arch shape. The in/out distance for a given teeth (or for types of teeth, or for all teeth) may be specified by user input. One illustrative process for orienting the teeth based on the second arch shape is described below in relation to FIGS. 5A-5B.

Following the determination of the positions of the 3D models of the patient's teeth method 200 ends. After method 200, aspects of method 200 may be repeated iteratively to generate new desired patient tooth configurations. When a desired arch shape is achieved, the arch shape may be saved and/or exported to indicated to the manufacturing parameters for an archwire to be used in orthodontic treatment plan.

Figure 3A:
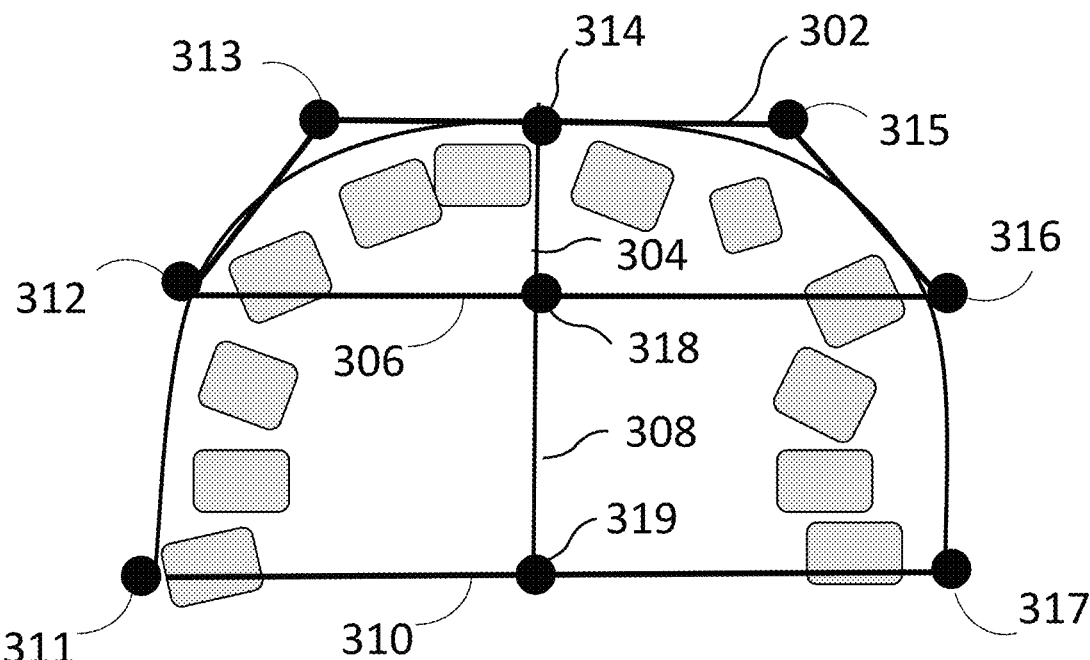
FIG. 3A illustrates a symmetric arch shape configuration, in accordance with some embodiments.

FIG. 3A illustrates a symmetric arch shape configuration 300, according to some embodiments. In symmetric arch shape configuration 300, pairs of control points will be equidistant from the midline of the arch. Accordingly, adjustments made by a user to a control point on the left side of the midline will result in corresponding adjustments to be made to a paired control point on the right side of the midline. Symmetric arch shape configuration 300 includes control points 311, 312, 313, 314, 315, 316, and 317. Control points 311, 312, and 313 are paired with control points 317, 316, and 315—respectively. Lines 302, 306, and 310 correspond to the distances between control points 313/315, 312/316, and 311/317—respectively. Control points 314, 318, and 319 are positioned along the arch midline. Lines 304 and 308 correspond to the distances between control points 314/318 and 318/319—respectively.

Accordingly, horizontal user adjustments to control point 312 will result in a symmetric change in distance 306 and a corresponding adjustment to control point 316. As an example of the user adjustments to the symmetric arch shape 300, a user may adjust control point 312 by moving the position of control point 312 left—increasing the distance between control point 312 and control point 318. In response, the position of control point 316 may be automatically updated to move control point 316 to the right—increasing the distance between control point 316 and control point 318.

Additionally, user adjustments to control points 314, 318, and 319 will result in changes in the height of the arch shape. For example, user adjustments to control point 314 will change distance 304, user adjustments to control point 318 will change distances 304 and 308, and user adjustments to control point 319 will change distance 308.

Figure 3B:
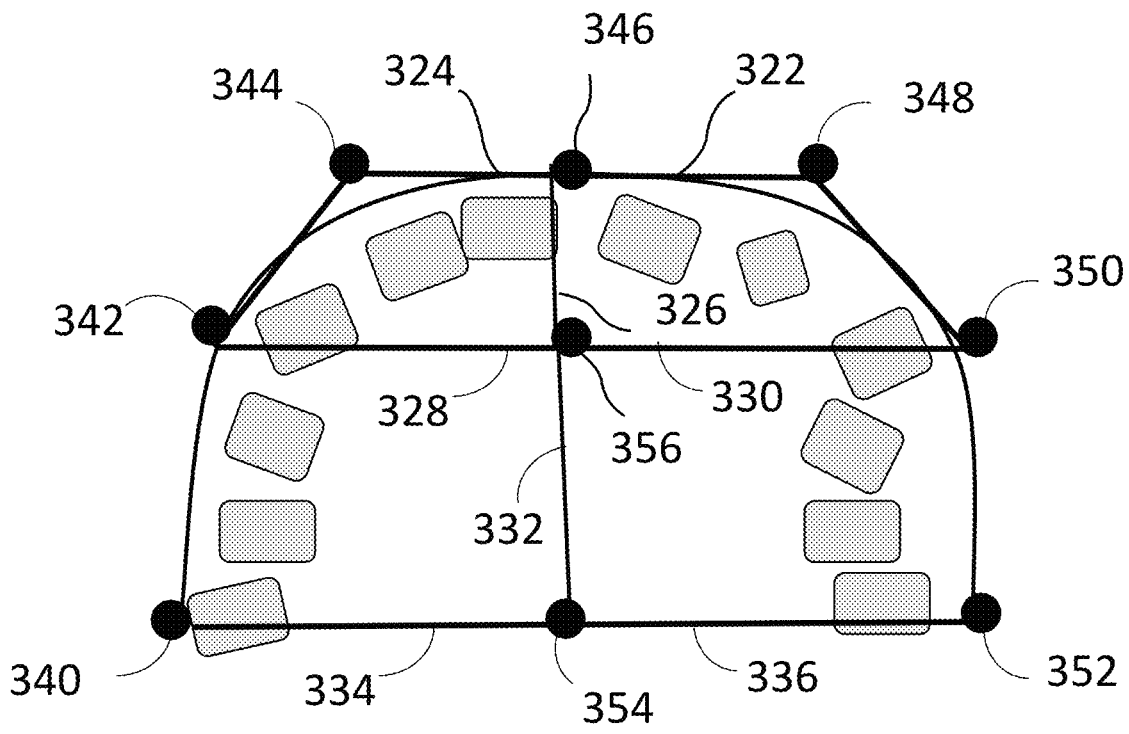
FIG. 3B illustrates an asymmetric arch shape configuration, in accordance with some embodiments.

FIG. 3B illustrates an asymmetric arch shape configuration 320, according to some embodiments. In asymmetric arch shape configuration 320, control points are independently adjusted relative to the midline of the arch. Accordingly, unlike adjustments made to the symmetric arch shape, adjustments made to control points of asymmetric arch shape configuration 320 may distort the arch shape. Asymmetric arch shape configuration 320 includes control points 340, 342, 344, 346, 348, 350, 352, 354, and 356. Lines 324, 328, and 334 correspond to the distances between control points 344/346, 342/356, and 340/354—respectively. Lines 322, 330, and 336 correspond to the distances between control points 348/346, 350/356, and 352/354—respectively.

Accordingly, horizontal user adjustments to control point 342 will result in an asymmetric change to the arch shape by changing distance 328. As an example of the user adjustments to the asymmetric arch shape 320, a user may adjust control point 342 by moving the position of 342 left—increasing the distance between control point 312 and control point 318. In contrast to the symmetric arch shape, corresponding control point 350 will not be automatically adjusted upon receiving an adjustment to control point 342.

Additionally, user adjustments to control points 346, 345, and 354 will result in changes in the height of the arch shape, as described above with reference to control points 314, 318, and 319.

Figure 3C:
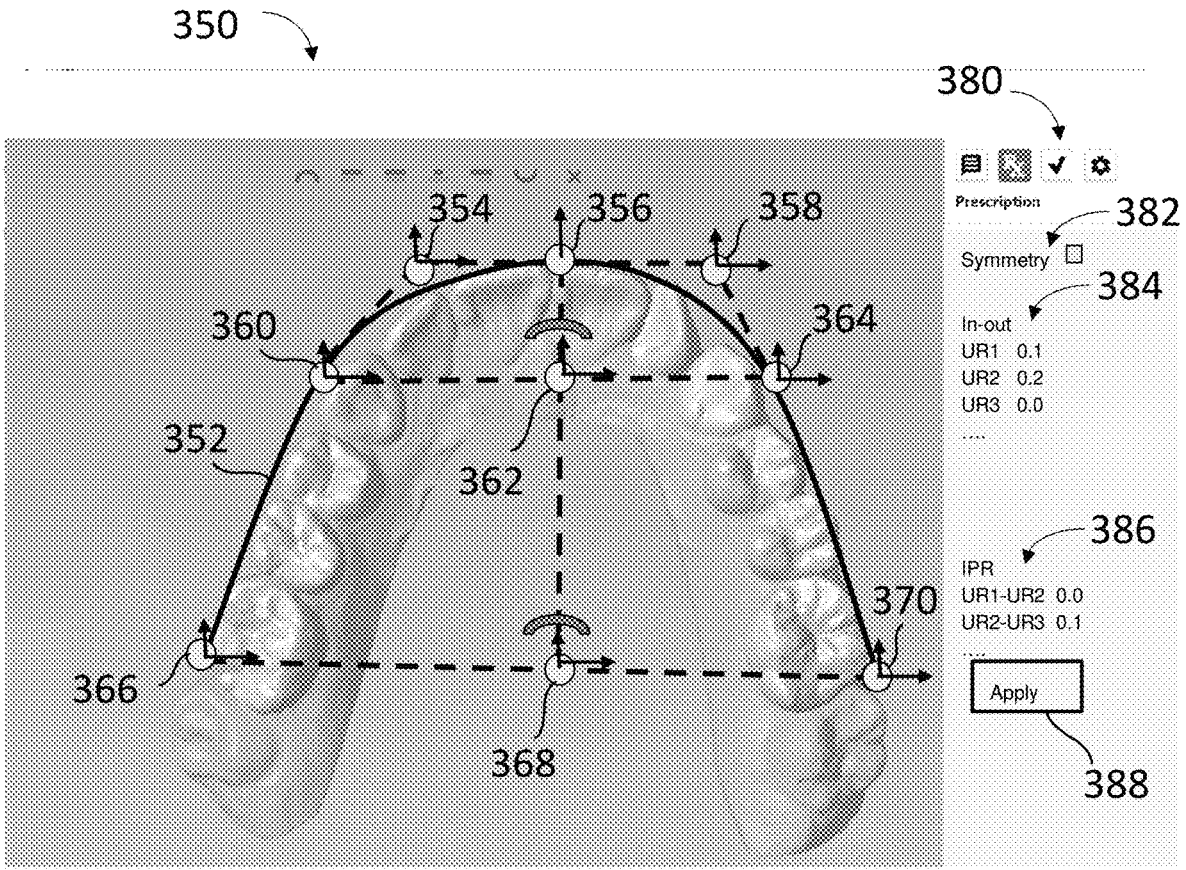
FIG. 3C illustrates a top view of 3D tooth models in an illustrative graphical user interface, in accordance with some embodiments.

FIG. 3C illustrates a top view of 3D tooth models in an illustrative graphical user interface (GUI), according to some embodiments. FIG. 3C illustrates GUI 350 that may display the positions of 3D tooth models and may allow a user to move control points associated with arch shape 352. GUI 350 includes control points 354, 356, 358, 360, 382, 364, 366, 368, and 370 for adjusting arch shape 352. GUI 350 may further include user controls 380, in/out parameter interface 384, interproximal reduction (IPR) parameter interface 386, and apply input button 388, in accordance with some embodiments. In other embodiments, the GUI may be presented differently using different graphical elements, as aspects of the technology described herein are not limited in this respect. Additionally, or alternatively, other embodiments may include additional, or fewer, features beyond those illustrated in FIG. 3C.

Graphical user interface 350 may include user controls 380 for changing settings of the user interface, in accordance with some embodiments. For example, a user may select a patient's file, select a patients upper or lower jaw, save a current configuration or archwire shape in connection with a patient treatment plan, and load different utilities associated with other aspects of a patient treatment plan by using the user controls 380. In some embodiments, the user may also adjust the number of control points by using user controls 380.

The GUI may provide for the ability to switch between symmetric and asymmetric arch shape configurations, in accordance with some embodiments. The control points illustrated in FIG. 3C may be configured as a symmetric arch shape configuration, as described in FIG. 3A, or as an asymmetric arch shape configuration, as described in FIG. 3B. In some embodiments, GUI 350 may include a symmetry setting 382. Symmetry setting 382 may be used to switch from an asymmetric arch shape configuration to a symmetric arch shape configuration. For example, a user may check the box associated with GUI symmetry setting 382 to set arch shape 352 to a symmetric arch shape configuration.

As described above, the positions of the teeth relative to the arch shape may include an in/out distance specifying the distance of the teeth relative to the curve. Graphical user interface 350 may include in/out parameter interface 384, in accordance with some embodiments. In/out parameter interface 384 may include an input field for each tooth depicted in the GUI along with an adjustable in/out value. The user may provide an in/out value by entering a distance for a given tooth using the in/out parameter interface 384.

Graphical user interface 350 may include IPR parameter interface 386, in accordance with some embodiments. Interproximal reduction parameter interface 386 may include an input field for each tooth depicted in the GUI alone with an adjustable IPR value. The user may provide an IPR value by entering an IPR parameter for a pair of adjacent teeth using IPR parameter interface 386.

An apply button may be included in GUI 350 for causing the GUI to update in accordance with the user's input, in accordance with some embodiments. Apply input button 388 is a virtual button clickable on the GUI as a control. The user may click the virtual button after inputting and/or adjusting other inputs on the GUI to cause the displayed arch shape 352 and/or positions of the 3D models of the teeth to update, in accordance with some embodiments. In other embodiments, all updates to the GUI may be applied in real time as the user makes adjustments. In such an embodiment, an apply button input may not be included.

Figure 4:
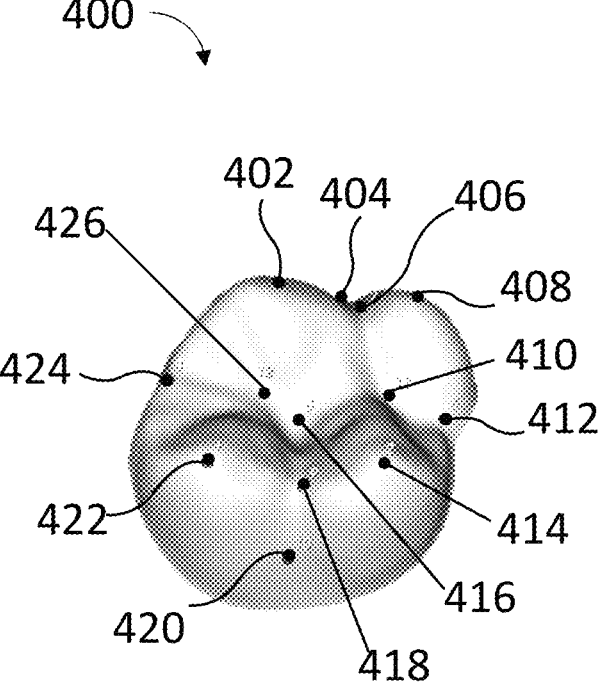
FIG. 4 shows an illustrative plurality of feature points for a 3D tooth model, in accordance with some embodiments.

FIG. 4 shows an illustrative plurality of feature points for a 3D tooth model, according to some embodiments. As described above, feature points may represent clinically relevant locations on a patient's tooth, such as the central points, marginal points, facial axis points, cusp points and/or pit/groove points. As shown in FIG. 4, clinically relevant locations on a patient's tooth, shown as 3D tooth model 400, may be represented by a plurality of feature points. The illustrated plurality of feature points includes feature points 402, 404, 406, 408, 410, 412, 414, 416, 418, 420, 422, 424, and 426. Of the plurality of feature points, feature points 402, 408, 414, and 422 correspond to cusp points; feature points 404, 406, 410, 418, and 426 correspond to pit/groove points; feature points 412 and 424 correspond to marginal points; feature point 420 corresponds to the facial axis point; and feature point 416 corresponds to the central point. In some embodiments, the number of feature points may be increased or decreased according to the clinical evaluations for which the feature points may be used in connection with the orthodontic treatment plan.

In accordance with act 210 in method 200, the feature points of the 3D models may be used to orient the 3D models of the teeth to the second arch shape. For example, to orient the 3D models of the teeth to the second arch shape, a tooth is first rotated to orient the tooth to the second arch shape; next, the tooth is then moved along a direction normal to the second arch shape so that the tooth is at a specified in/out distance from the second arch shape; finally, the tooth is moved tangent to the second arch shape so that the distance between the tooth and its neighboring tooth models corresponds to the specified IPR value.

FIG. 5A shows an illustrative diagram 500 of act 210, according to some embodiments. Diagram 500 shows a plurality of 3D tooth models aligned with second arch shape 510. Three-dimensional tooth model 501 is oriented to second arch shape 510 using alignment line 502 which passes through the facial axis and centroid points, as further described below in connection with FIG. 5B. Following alignment, the tooth is moved normal to the second arch shape 510, as shown with reference to 3D tooth model 503. Three-dimensional tooth model 503 is moved along line 506—which is oriented normal to second arch shape 510—until 3D tooth model 503 is at a specified in/out distance from second arch shape 510. Once at the specified in/out distance, 3D tooth models 503 and 501 are moved relative to each other and tangent to the second arch shape 510. The 3D tooth models are moved such that the relative orientation of each tooth to the curvature of the second arch shape—based on alignment line 502—is maintained. Three-dimensional tooth models 503 and 501 are moved until the distance between them corresponds to the specified IPR value 504.

In some embodiments, when moving a plurality of 3D tooth models according to their specified IPR values, the movement starts with the position of the central incisor teeth, at the midline of the second arch shape. After positioning the central incisors, the positioning of the other 3D tooth models proceeds from the front of the mouth to the back, one after the other. In other embodiments, the positioning may start with back molars and then proceed forward from back to front. In yet other embodiments, the positioning may start with premolar teeth and then the positing of subsequent 3D tooth models may alternate between positioning of teeth located closer to the front of the mouth with teeth located closer to the back of the mount until each 3D model has been positioned.

In some embodiments, the centroid point and the facial axis point may be used to orient a 3D model of the tooth to the second arch shape. For example, a 3D tooth model may be rotated such that an alignment line that passes through the centroid point and the facial axis point is substantially perpendicular to the tangent of the second arch shape at the point where the alignment line intersects with the arch shape. In other embodiments, other feature points may be used to determine the orientation of the tooth relative to the second arch shape.

FIG. 5B shows illustrative feature points which may be used to orient a 3D tooth model to the second arch shape, according to some embodiments. FIG. 5B shows partial jaw view 520 including a plurality of 3D tooth models aligned with second arch shape 522. As described above, in some embodiments, an alignment line which passes through the centroid point 526 and facial axis point 530 is used to orient the 3D tooth model 523 to the second arch shape 522. For example, the tooth will be rotated until the alignment line which passes through the centroid and facial axis points is oriented normal to the second arch curve 522.

Additionally, or alternatively, marginal points may be used to orient posterior teeth to the second arch shape, in accordance with some embodiments. A 3D tooth model may be rotated until an alignment line which passes through marginal points is substantially parallel to the tangent of the second arch shape at the point closest to the center of the line between the points. For example, 3D tooth model 523 may be rotated until an alignment line which passes through marginal points 524 and 528 is substantially parallel to the tangent of the second arch shape 522.

Additionally, or alternatively, incisal points may be used to orient anterior teeth to the second arch shape, in accordance with some embodiments. A 3D tooth model may be rotated until an alignment line which passes through incisal points is substantially parallel to the tangent of the second arch shape at the point closes to the center of the line between the points. For example, 3D tooth model 531 may be rotated until an alignment line which passes through mesial incisal point 532 and distal incisal point 534 is substantially parallel to the tangent of the second arch shape 522.

Figure 6:
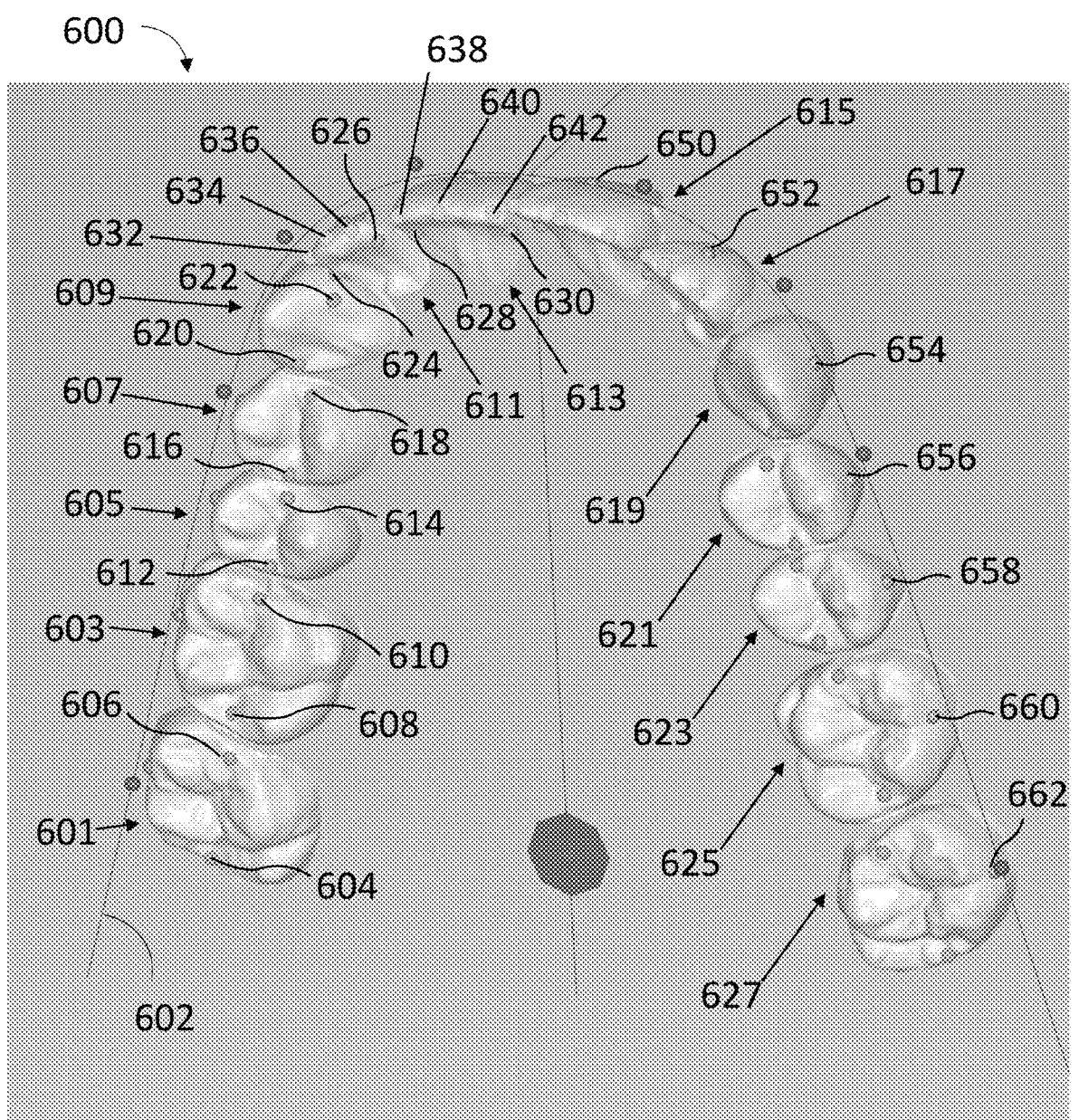
FIG. 6 shows an illustrative configuration of a second arch shape and representative feature points that may be used for alignment for a plurality of 3D tooth models, in accordance with some embodiments.

FIG. 6 shows an illustrative configuration 600 of a second arch shape and representative feature points that may be used for alignment for a plurality of 3D tooth models, according to some embodiments. Configuration 600 includes a plurality of 3D tooth models aligned to second arch shape 602. As shown in FIG. 6, the plurality of 3D tooth models includes 3D tooth models 601, 603, 605, 607, 609, 611, 613, 615, 617, 619, 621, 623, 625, and 627. In accordance with the techniques for aligning the 3D tooth models with the second arch shape described herein—the facial axis, marginal, and incisal feature points for the plurality of 3D tooth models are illustrated. As shown in FIG. 6, the pairs of marginal points 604/606, 608/610, 612/614, 616/618, 620/622, 624/626, and 628/630 correspond to 3D tooth models 601, 603, 605, 607, 609, 611, and 613—respectively. Accordingly, in some embodiments, the marginal points may be used to align 3D tooth models to the second arch shape, as described above in connection with FIG. 5B.

Additionally, the facial axis points 650, 652, 654, 656, 658, 660, and 662 which correspond to 3D tooth models 615, 617, 619, 621, 623, 625, 627—respectively. Accordingly, in some embodiments, the facial axis points may be used to align 3D tooth models to the second arch shape by using an alignment line based on the facial axis and centroid points, as described above in connection with FIG. 5B.

Additionally, or alternatively, the mesial, middle, and discal incisal points 632/634/936 and 638/640/642 which correspond to 3D tooth models 611 and 613—respectively—may be used to align 3D tooth models to the second arch shaped, as described above in connection with FIG. 5B. In some embodiments, a combination of the facial axis, marginal, and/or incisal points may be used to orient the 3D tooth models to the second arch shape.

Figure 7:
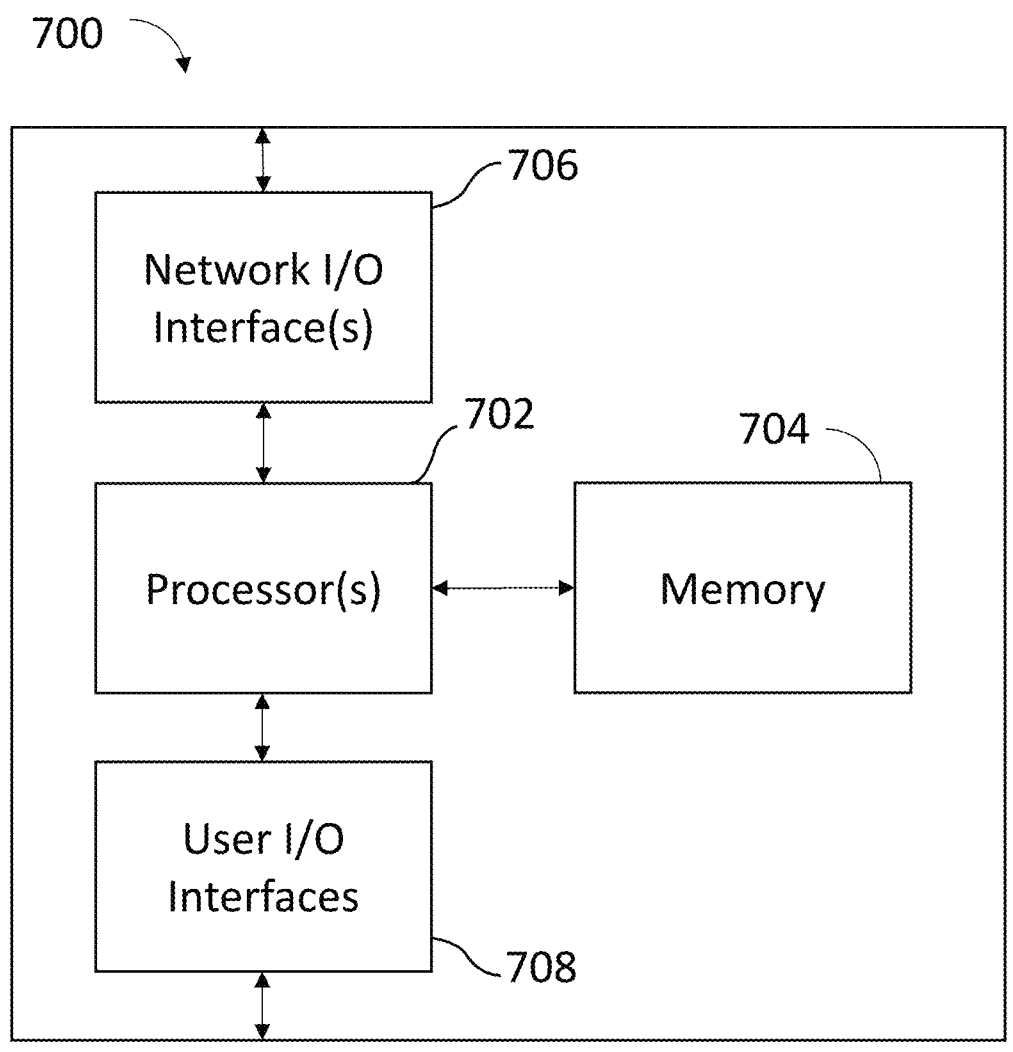
FIG. 7 is a block diagram of an illustrative computing device, in accordance with some embodiments.

In some embodiments, systems and techniques described herein may be implemented using one or more computing devices. In particular, a computing device may be operated to perform method 200, as described above. Embodiments are not, however, limited to operating with any particular type of computing device. By way of further instruction, FIG. 7 is a block diagram of an illustrative computing device 700, according to some embodiments. Computing device 700 may include one or more processors 702 and one or more tangible, non-transitory computer-readable storage media (e.g., memory 704). Memory 704 may store, in a tangible non-transitory computer-recordable medium, computer program instructions that, when executed, implement any of the above-described functionality. Processor(s) 702 may be coupled to memory 704 and may execute such computer program instructions to cause the functionality to be realized and performed.

Computing device 700 may also include a network input/output (I/O) interface 706 through which the computing device may communicate with other computing devices (e.g., over a network), and may also include one or more user I/O interfaces 708, through which the computing device may provide output to and receive input from a user. The user I/O 708 interfaces may include devices such as a keyboard, a mouse, a microphone, a display device, (e.g., a monitor or touch screen), speakers, a camera, and/or various other types of I/O devices.

The above-described embodiments can be implemented in any of numerous ways. As an example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-described functions. The one or more controllers can be implemented in numerous ways such as with dedicated hardware, or with general purpose hardware (e.g., one or more processors) that is programmed using microcode or software to perform the functions recited above.

Furthermore, when implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

In some embodiments, a software-based application may be connected (e.g., via a wired or wireless connection) to one or more components of a computing device. In certain embodiments, for example, the computing device 700 may be controlled, at least in part, by a software-based application. In some cases, a user may operate a graphical user interface to perform one or more acts of method 200 through the software-based application. In some cases, the software-based application may store information (e.g., arch shapes, feature points, control point positions, etc.) generated based on user input.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-described functions of one or more embodiments. The computer-readable storage medium may be transportable such that the program stored thereon can be loaded onto any computing device to implement aspects of the techniques described herein. In addition, it should be appreciated that the reference to a computer program which, when executed, performs any of the above-described functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques described herein.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value. The term "substantially equal" may be used to refer to values that are within +20% of one another in some embodiments, within +10% of one another in some embodiments, within +5% of one another in some embodiments, and yet within +2% of one another in some embodiments.

The term "substantially" may be used to refer to values that are within +20% of a comparative measure in some embodiments, within +10% in some embodiments, within +5% in some embodiments, and yet within +2% in some embodiments. For example, a first direction that is "substantially" perpendicular to a second direction may refer to a first direction that is within +20% of making a 90° angle with the second direction in some embodiments, within +10% of making a 90° angle with the second direction in some embodiments, within +5% of making a 90° angle with the second direction in some embodiments, and yet within +2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method for determining target positions of a patient's teeth for an orthodontic procedure, the method comprising:

using at least one processor:

determining a first arch shape for initial positions of a plurality of teeth based on a plurality of feature points that each identifies a location with respect to one of the plurality of teeth;

determining a plurality of control points for characterizing the first arch shape;

receiving user input indicative of a change in position of one or more of the plurality of control points, thereby defining a modified plurality of control points;

determining a second arch shape that is a shape of an archwire, and is based on the modified plurality of control points; and determining positions of a plurality of 3D models of the patient's teeth based on the second arch shape.

2. The method of claim 1, wherein determining the positions of the plurality of 3D models of the patient's teeth based on the second arch shape comprises determining, for each tooth of the plurality of teeth, an orientation of the tooth and a position of the tooth.

3. The method of claim 2, wherein determining the orientation of the tooth comprises determining the orientation of the tooth for which an alignment line that passes through a centroid point of the tooth and a facial axis point of the tooth is perpendicular to the second arch shape at a point where the alignment line intersects the arch shape.

4. The method of claim 2, wherein determining the position of the tooth comprises determining the position of the tooth for which a distance between the tooth and the second arch shape matches a user selected in/out distance, wherein the in/out distance is a distance measured from a facial axis point of the tooth to the second arch shape along an alignment line which passes through a centroid point of the tooth and the facial axis.

5. The method of claim 2, further comprising determining a separation distance between a pair of adjacent teeth when the teeth are arranged according to the determined positions of the plurality of 3D models, and determining whether or not an interproximal reduction (IPR) would result between the pair of adjacent teeth based on the determined separation distance.

6. The method of claim 1, further comprising displaying the plurality of control points via a graphical user interface.

7. The method of claim 6, wherein the user input comprises input through the graphical user interface indicating motion of a control point from an initial position of the control point to a final position of the control point.

8. The method of claim 7, wherein receiving the user input further comprises receiving user input indicative of bracket placement for the plurality of teeth.

9. The method of claim 6, further comprising displaying the determined positions for the plurality of 3D models of the patient's teeth via the graphical user interface.

10. The method of claim 1, wherein the feature points are indicative of the initial positions of the plurality of teeth.

11. The method of claim 1, wherein determining the first arch shape comprises determining a plurality of arch points based on the plurality of feature points, and determining the first arch shape based on the determined plurality of arch points.

12. The method of claim 11, wherein determining the plurality of arch points is based at least in part on one or more tube anchor facial axis points, canine anchor facial axis points and/or central anchor facial axis points.

13. The method of claim 12, wherein determining the plurality of arch points comprises determining one or more of:

a distance between a pair of tube anchor facial axis points;

a distance between a pair of canine anchor facial axis points;

a distance between a pair of central anchor facial axis points;

a distance between a midpoint of the pair of central facial axis points and a midpoint of the pair of canine facial axis points; and a distance between the midpoint of the pair of canine facial axis points and the midpoint between the pair of molar facial axis points.

14. The method of claim 11, wherein determining the plurality of arch points comprises applying a facial distance offset to one or more of the plurality of feature points.

15. The method of claim 11, wherein determining the first arch shape comprises generating a curve that passes through the plurality of arch points.

16. The method of claim 11, wherein determining the plurality of control points comprises selecting the plurality of arch points as the plurality of control points.

17. The method of claim 1, wherein determining the first arch shape comprises generating a curve that passes through the plurality of feature points.

18. The method of claim 1, wherein determining the plurality of control points comprises determining a plurality of spline control points for the first arch shape, and selecting the plurality of spline control points as the plurality of control points.

19. The method of claim 18, wherein determining the second arch shape comprises:

determining modified positions of the plurality of control points based on the received user input; and upon determining the modified positions of the plurality of control points, determining an updated non-uniform rational B-spline through final positions of the plurality of control points.

20. The method of claim 11, wherein the second arch shape is symmetric across a sagittal plane of a patient.

21. The method of claim 11, wherein the second arch shape is asymmetric across a sagittal plane of a patient.

22. The method of claim 1, wherein the plurality of feature points each identify a surface location on one of the plurality of teeth.

23. The method of claim 22, wherein the feature points comprise one or more facial axis points, marginal points, and/or centroid points.

24. At least one non-transitory computer readable medium comprising instructions that, when executed by at least one processor, perform a method for determining target positions of a patient's teeth for an orthodontic procedure, the method comprising:

determining a first arch shape for initial positions of a plurality of teeth based on a plurality of feature points that each identifies a location with respect to one of the plurality of teeth;

determining a plurality of control points for characterizing the first arch shape;

receiving user input indicative of a change in position of one or more of the plurality of control points, thereby defining a modified plurality of control points;

determining a second arch shape that is a shape of an archwire, and is based on the modified plurality of control points; and determining positions of a plurality of 3D models of the patient's teeth based on the second arch shape.

25. A system comprising:

at least one processor; and at least one non-transitory computer readable medium comprising instructions that, when executed by the at least one processor, perform a method for determining positions of a plurality of feature points of a patient's tooth based on a statistical tooth model, the method comprising:

determining a first arch shape for initial positions of a plurality of teeth based on a plurality of feature points that each identifies a location with respect to one of the plurality of teeth;

determining a plurality of control points for characterizing the first arch shape;

receiving user input indicative of a change in position of one or more of the plurality of control points, thereby defining a modified plurality of control points;

determining a second arch shape that is a shape of an archwire, and is based on the modified plurality of control points; and determining positions of a plurality of 3D models of the patient's teeth based on the second arch shape.

* * * * *